United States Patent Office 3,447,821
Patented June 3, 1969

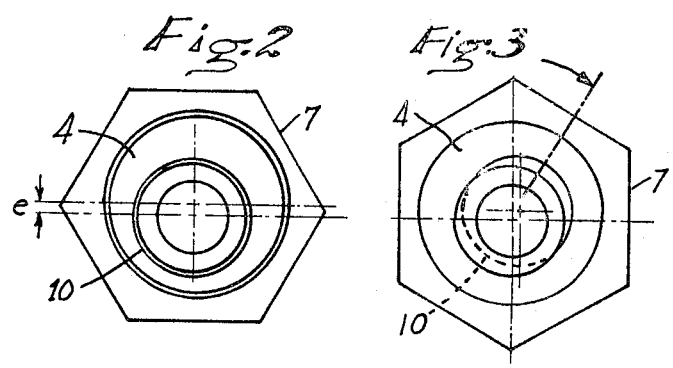
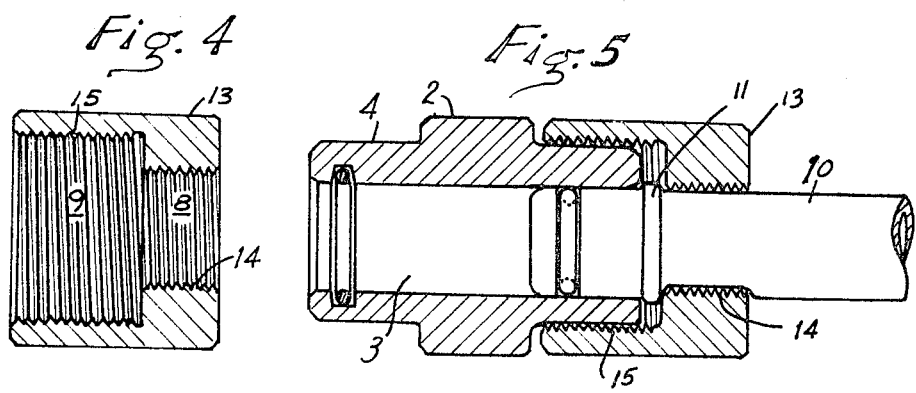
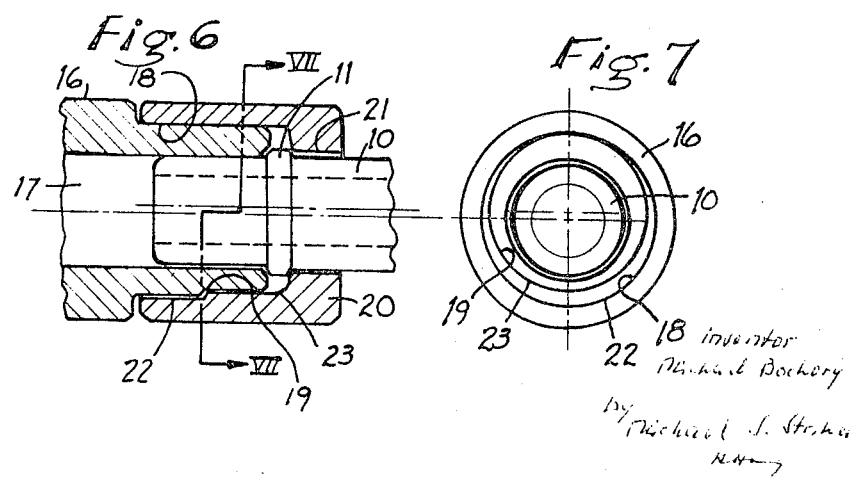

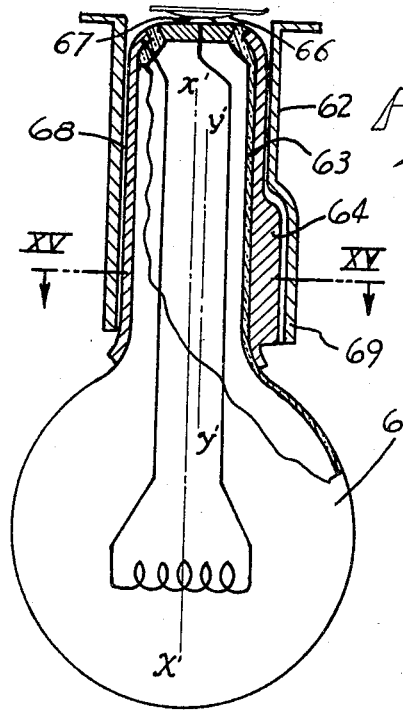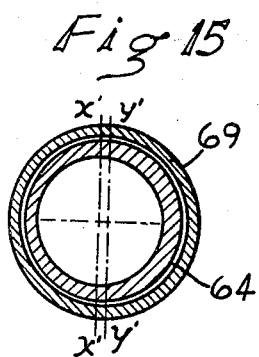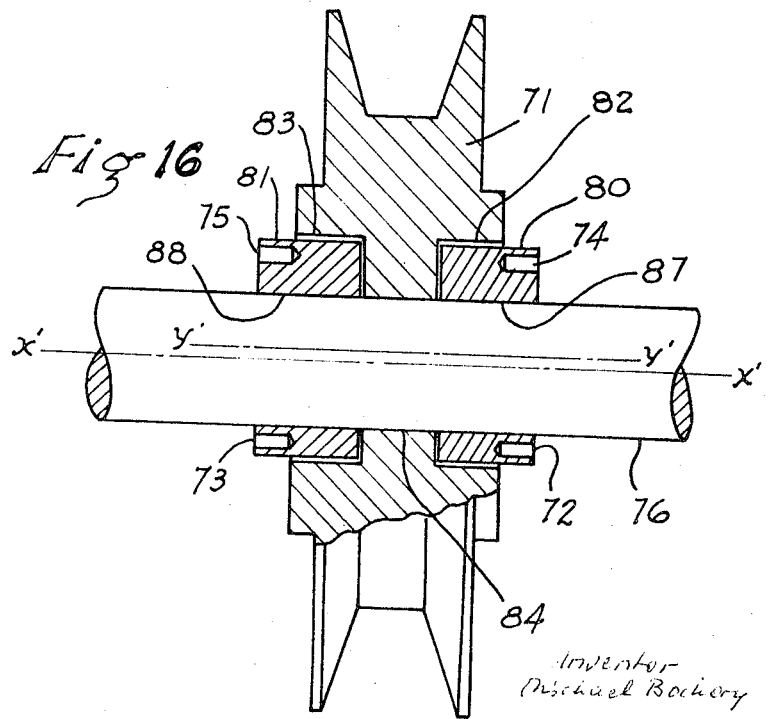

3,447,821
FASTENING MECHANISM
Michael Bochory, Los Angeles, Calif. (6124 Buckingham Parkway, Culver City, Calif. 90230)
Continuation-in-part of application Ser. No. 472,560, July 16, 1965. This application Mar. 9, 1967, Ser. No. 621,904
Int. Cl. F16l 55/00
U.S. Cl. 285—178    10 Claims

ABSTRACT OF THE DISCLOSURE

A female member is provided with an inner circumferential surface of circular outline. A male member is provided with an outer peripheral surface of circular outline. The outer peripheral surface is received within the confines of the inner circumferential surface, and cam means are provided for moving the members radially relative to one another in response to their angular displacement with reference to each other, for providing a wedging action between them.

Cross references to related applications

The present invention is a continuation-in-part of my copending application, Ser. No. 472,560, July 16, 1965, entitled, "Fastening Mechanism" and now abandoned.

Background of the invention

The present invention relates to a fastening arrangement in general, and more particularly to a fastening arrangement for joining and locking together two or more component units. Still more particularly the present invention relates to such a fastening arrangement for joining or locking two or more component units without requiring the use of auxiliary parts, such as nuts or bolts, and without the necessity of providing screw threads of any type on the component unit which are to be locked together.

It is well known in the field of connecting and coupling devices to connect various component elements by means of threaded members, such as screws, bolts and nuts. Pipes are generally connected via threaded couplings which include pipe unions and the like, or by means of bolted flanges which require screws or bolts to hold the abutting or adjoining flanges of two pipes together. In other applications, for instances in erecting a skeleton construction in which pipes, tubing or rods are to be secured to one another, it is known to use collars which are provided with bolts and nuts to grip the skeleton members to be secured to one another, and which lock these members together by frictional force, which keeps the members thus secured to one another from sliding free.

All of these arrangements possess certain inherent difficulties and disadvantages it should be noted that to some extent all of these arrangements use threaded means of one type or another and it is a particular disadvantage of such threaded means that threads are apt to become worn or even stripped, thus making the resulting connection highly unreliable. There is also the fact that it is necessary in order to obtain engagement of the screw threads of cooperating threaded means to turn at least one of these threaded means through more than 360 degrees, a manipulative step which is not only time consuming but is frequently difficult or even impossible to carry out because of space limitations or similar difficulties.

Summary of the invention

The present invention overcomes the disadvantages of the prior art as outlined above.

More particularly, the present invention provides a fastening arrangement for securing two or more component members to one another without any means for screw-threading.

The fastening arrangement in accordance with the present invention is simple to manufacture, therefore very economical both in its manufacturing cost and its retail price, and highly reliable in its operation.

The fastening arrangement in accordance with the present invention lends itself for being manufactured from a great variety of different materials.

A particular advantage of the present invention is that the fastening arrangement to which it appertains is suitable for many applications and that the novel fastening arrangement can be used for joining two or more plate members together with similar ease as for joining, for instance, two components of a high-pressure coupling.

In accordance with one feature of my invention I provide a fastening arrangement which includes a first member having a bore bounded by an inner circumferential surface, and this circumferential surface surrounds the axis of the bore. My fastening arrangement further comprises a second member which has a substantially cylindrical portion receivable in the bore and is provided with an outer circumferential surface surrounding the axis of the portion thus receivable. Furthermore, the second member is provided with guide means tending to move the cylindrical section of the second member radially with reference to the first member. One of the surfaces which respectively bound the bore and surround the cylindrical portion of the second member, is thus moved to a position of eccentricity with respect to the other so that, when the cylindrical portion of the second member is received in the bore of the first member, rotation of the members about their respective axis results in camming cooperation of portions of the surfaces, thus producing a wedge-action and locking the members together.

Brief description of the drawing

FIG. 2 is a transverse section taken on the line II—II of FIG. 1;

FIG. 3 is a section similar to FIG. 2, but showing in dotted lines the relative positions of the parts of FIG. 2 after the same have been rotated to some extent about their respective axes;

FIG. 4 is a longitudinal section through a coupling sleeve in accordance with the present invention;

FIG. 5 is a longitudinal section similar to that shown in FIG. 1, showing a further embodiment of the invention which utilizes a coupling sleeve similar to that shown in FIG. 4;

FIG. 6 is a fragmentary longitudinal section of a further embodiment of the invention;

FIG. 7 is a transverse section taken on the line VII—VII of FIG. 6;

FIG. 14 is a fragmentary section, showing yet a further embodiment of the invention for securing a light bulb in a socket;

FIG. 15 is a transverse section taken on the line XV—XV of FIG. 14;

FIG. 16 is an axial partial section through another embodiment of the invention;

Description of the preferred embodiments

Figure 1:
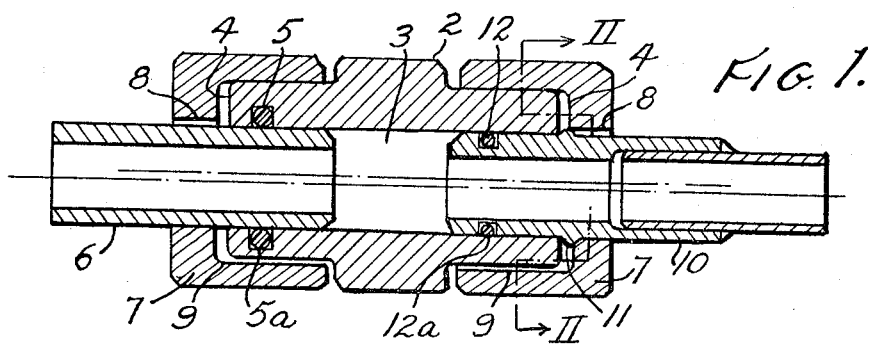
FIG. 1 is a longitudinal section through one embodiment of the present invention.

Discussing now the drawing in detail, and firstly FIG. 1 thereof, it will be seen that my novel fastening device shown therein, is used in this embodiment to couple and lock together two cylindrical pipes respectively identified with reference numerals 6 and 10. I provide a male cylindrical coupling sleeve 2 having a bore 3 of a diameter just sufficient to accommodate the cylindrical pipes 6 and 10 as is clearly evident from FIG. 1. The end portions 4 of the male coupling sleeve 2 have external cylindrical surfaces which surround the axis of the bore 3 in eccentric relationship thereto. At one end the bore 3 is provided with an innner peripheral groove 5a which accommodates an O-ring 5 for sealing purposes as will be discussed later.

The end portions of the pipes 6 and 10 are respectively received in one end of the cylindrical male coupling sleeve 2 after first extending through a bore 8 provided on respective female coupling sleeves 7 which hereafter will be referred to as auxiliary coupling sleeves 7 for purposes of expediency. The respective bores 8 of the auxiliary sleeve 7 have, as is evident from the drawing, a diameter sufficient to permit the end portions of the pipes 6 and 10 to extend readily therethrough. In turn each of the auxiliary sleeves 7 is provided with a counterbore 9 extending into the respective sleeve 7, from a direction opposite the associated bore 8, and each of these counter bores has a diameter large enough to accommodate therewithin the respective end portion 4 of the male coupling sleeve 2. In accordance with the invention, the counter bores 9 are eccentric with reference to the axis of the respective bores 8, and further in accordance with the invention it is preferred that such eccentricity be of an amount $e$, shown in FIG 2, such that $$0.28R > e > 0.22R$$

where R is the radius of the counter bore 9.

The pipe 10 is provided with a radial flange 11 at a point which is located within the counter bore 9, thereby preventing axial movement of the pipe 10 in the direction outwardly of the counter bore 9, that is through the bore 8. Furthermore, the pipe 10 is provided with a groove 12A which accommodates an O-ring 12 for sealing purposes.

When the arrangement shown in FIG. 1 has been assembled in the illustrated manner, the auxiliary sleeves 7 and the male coupling sleeve 2 are rotated with reference to one another to an extent which may vary between 1 and 45 degrees, depending on the eccentricity of the counter bores 9, and the pipes 6 and 10 are thus locked in place. This is accomplished by the camming engagement between a portion of the inner circumferential surface bounding bore 8 with a portion of the outer peripheral surface of the pipe 10, as well as a portion of the inner circumferential portion of counter bore 9, which is wedged into engagement with either peripheral surface of the end portion 4 of the male cylindrical coupling sleeve 2. It will be understood that the frictional forces which develop upon initial engagement of these surface portions increase with continued relative rotation of the auxiliary sleeves 7 relative to the male coupling sleeve 2 until the latter, together with the auxiliary sleeve 7 securely locks the pipes 6 and 10 in place. At this time, the flange 11 will reliably prevent withdrawing of the pipe 10 from the fastening device. It should be pointed out that the provision of the flange 11 is not necessary if the hardness characteristics of the material of the pipe 10 are such that the pipe 10 is not easily deformed, and that the flange 11 is needed primarily if the material of pipe 10 is soft or resilient enough to undergo deformation easily, when subjected to the aforementioned camming action.

The relative positions of the various members of the coupling or fastening arrangement shown in FIG. 1 are illustrated in FIG. 3 as they appear after the relative rotation of male coupling sleeve 2 and auxiliary sleeve 7, and thereby the locking of the arrangement has taken place. This figure is self-explanatory and the arrow which is associated with FIG. 3 is intended to indicate the direction of rotation of the sleeve 7.

FIG. 4 shows an auxiliary female coupling sleeve substantially similar to the one indicated with reference numeral 7 in FIG. 1. However, the sleeve in FIG. 4 to which reference numeral 13 appertains, differs from the sleeve 7 in FIG. 1 in that its bore 8 and counter bore 9 are provided with inner circumferential grooves or screw threads, numbered 14 and 15, respectively. FIG. 5 shows, that when a sleeve such as the sleeve 13 of FIG. 4 is used in an arrangement of the type illustrated in FIG. 1, the grooves or threads 14 and 15 are forced into the external peripheral surfaces of the pipe 10 and the end portion 4 of the sleeve 2 respectively. Of course, this occurs only over part of the area of the respective surfaces and such penetration is illustrated in FIG. 5, somewhat exaggeratedly, to facilitate better understanding. The purpose of this, of course, is to provide further assurance of a reliable connection that is to enhance the holding action. It might be pointed out that with a self-threading or tapping arrangement of this type, the proper selection of a lead angle for the threads 14 and 15 will also serve to advance the sleeves 2 and 13 toward one another, when such self-tapping occurs, by a distance which is equal to the selected lead angle.

Coming now to the embodiment shown in FIGS. 6 and 7, it will be seen that the male coupling sleeve is identified there with reference numeral 16 and that it is largely the same as the coupling sleeve 2 shown in FIG. 1. It differs therefrom, however, in that this end portion which corresponds to the end portions 4 of the sleeve 2 shown in FIG. 1, is stepped. In other words, the end portion of the male coupling sleeve 16 consists of an inner portion having an outer circumferential surface 18 and an outer portion or forward portion having an outer circumferential surface 19. The outer circumferential surface 18 of the inner portion is concentric with respect to the axis of the through-going bore 17 of sleeve 16, such bore 17 corresponding to the bore 3 of the sleeve 2 shown in FIG. 1. The outer peripheral surface 19 of the forward section of the end portion is eccentric with respect to the axis of bore 17.

The auxiliary sleeve is indicated with reference numeral 20 and it is provided with a bore 21 which has a slightly smaller inner diameter than the outer diameter of the flange 11 of the pipe 10. The counter bore of the auxiliary sleeve 20 is also stepped, complementary to the configuration of the end portion of male sleeve 16, and comprises an inner circumferential surface 22 within which the outer peripheral surface 18 of sleeve 16 is located, when the arrangement is assembled, and an inner circumferential surface 23 within which the outer peripheral surface 19 of the sleeve 16 is located in the assembled condition of the arrangement. The surface 23 is eccentric with respect to the axis of bore 21 whereas the surface 22 is concentric with this action and the respective parameters of the openings binded by the surfaces 22, 23 respectively are such that these openings will just accommodate the respective sections of the end portion of sleeve 16 which are defined by the surfaces 18 and 19.

The arrangement shown in FIGS. 6 and 7 is operated, that is the pipe 10 is locked to the fastening arrangement by rotating the sleeve 16 and the auxiliary sleeve 20 relative to one another, thus forcing portions of the external surfaces 18 and 19 into contact with portions of the surfaces 22, 23 and 21, respectively, and thereby causing the sleeve 16 and the auxiliary sleeve 20 to wedge against one another, thus holding the flange 11 of pipe 10, as is clearly evident from the drawing. FIG. 7, which is a section taken on the line VII—VII of FIG. 6, shows the arrangement after this relative rotation has occurred, and illustrates the relative positions of the various members.

Figure 8:
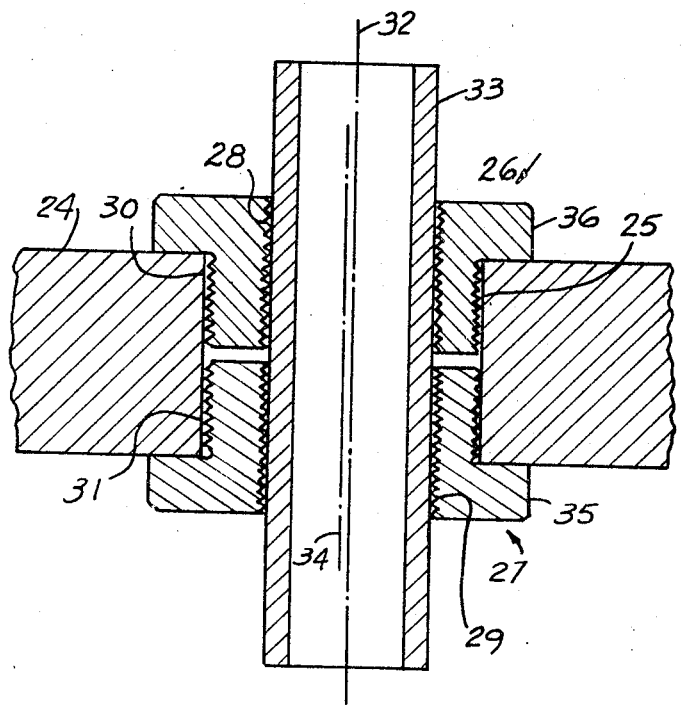
FIG. 8 is a sectional view taken through another embodiment of the present invention.

Coming now to FIG. 8, it will be seen that there is illustrated therein still a further embodiment of the invention. In this embodiment it is assumed that the invention is to be used to lock a cylindrical pipe 33 securely into a bore 25 of a member 24 which latter may be a wall or wall portion of a larger body. In the arrangement shown in FIG. 8 there are provided two locking sleeves, respectively identified with reference numerals 26 and 27, and the sleeve 26 comprises a cylindrical portion 30 whereas the sleeve 27 comprises a cylindrical portion 31. Each of these cylindrical portions 30 and 31, respectively, has an outside diameter just large enough to enable this portion to fit into the bore 25 of member 24. The sleeve 26 further has an outer end portion which is preferably of hexagonal configuration and which is identified with reference numeral 36, the outer end portion 36 being of a diameter larger than the bore 25, so that it is not receivable therewithin. A similar hexagonal outer end portion, numbered 35, is provided on the sleeve 27.

The sleeves 26 and 27 are respectively provided with eccentric bores 28 and 29, of an inner diameter large enough to accommodate a cylindrical pipe 33 therewithin. In the assembled condition of the arrangement shown in FIG. 8, the cylindrical portion 30 and 31, of the sleeve 26 and 27, respectively extend into the bore 25 of member 24 from opposite ends thereof in such a manner that the axes 32 of the bores 28 and 29 are aligned so that the pipe 33 is receivable in the thus-aligned bores 28 and 29. Preferably, but not necessarily, the inner peripheral surfaces of the bores 28 and 29 as well as the outer circumferential surfaces of the cylindrical portions 30 and 31 are provided either with circumferential grooves or with screw threads which are not identified with reference numerals.

The arrangement of FIG. 8 is locked by rotating the sleeves 26 and 27 in opposite direction, the hexagonal shape of the end portions 35 and 36 facilitating the engagement of the sleeves and the rotation of the same. If threads or grooves such as illustrated in FIG. 8 are provided, then these will penetrate into the surfaces which they are forced to engage as a result of the eccentricity of the bores 28 and 29, and the threads or grooves will then cut for themselves counter part in these surfaces. The frictional forces which are thus developed as well as the penetration of the screws or threads into their mating counterpart on the pipe 33 and the member 24, insure that the sleeves 26 and 27 of pipe 33 will remain securely cammed in engagement with one another and will not rotate or undergo an axial shifting movement.

Figure 9:
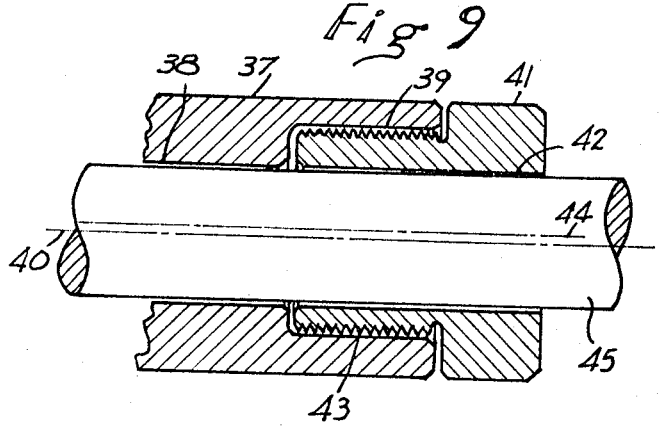
FIG. 9 is a longitudinal section taken through yet a further embodiment.

In the embodiment shown in FIG. 9, it is assumed that a cylindrical rod or similar body 45 is to be locked to an element 37. The latter is provided with a bore 38 with an inner diameter just large enough to accommodate therewithin the cylindrical rod 45, and the element 37 is so provided with a counter bore 39 which is eccentric with respect to the bore 38. An auxiliary male sleeve 41 is provided which is substantially the same as auxiliary sleeve 26 described above with reference to FIG. 8. The sleeve 41 is provided with an eccentric bore 42 whose diameter is the same as the diameter of bore 38. A portion 43 of the auxiliary sleeve 41, similar in its configuration to the portion 30 of the auxiliary sleeve 26 of FIG. 8, has a diameter which is just less than the diameter of counter bore 38 receivable therein. It will be evident from FIG. 9 that the portion 43 of auxiliary sleeve 41 is fitted into the counterbore 39 so that the axis of portion 43 coincides with the axis of counterbore 39. Thereupon, the cylindrical pipe 45 is inserted through the bore 42 with the auxiliary sleeve 41 and through the bore 38 of the element 37.

It is now simply necessary to rotate the auxiliary sleeve 41 with reference to the element 37, or vice versa, in the manner described with respect to preceding embodiment in order to lock the cylindrical pipe 45, the auxiliary sleeve 41, and the element 37 together.

Figure 10:
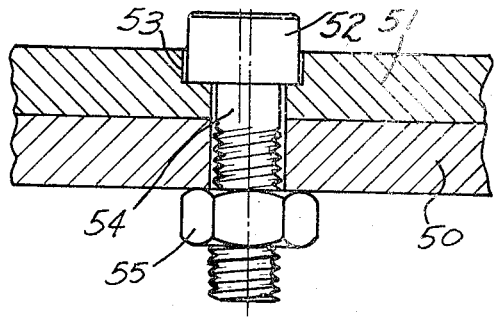
FIG. 10 is a fragmentary sectional view taken on the line X—X of FIG. 11, and showing an additional embodiment of the invention.
Figure 11:
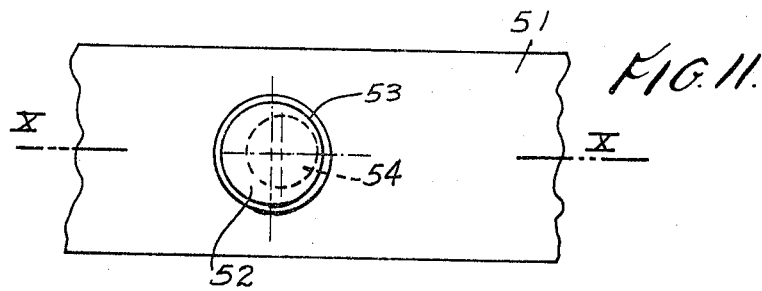
FIG. 11 is a top plan view of the embodiment shown in FIG. 10.

FIGS. 10 and 11 illustrate the application of the novel invention in locking together two plate members 50 and 51. The embodiment shown in FIGS. 10 and 11 is of particular advantage when the head of a bolt used for locking the members 50 and 51 to one another cannot be engaged with a tool in order from keeping the bolt from rotating when the associated nut is tightly being tied. FIG. 10 illustrates the plate members 50 and 51 as overlying one another and as being provided with respective aligned bores having a diameter just large enough to permit the shank 54 of a locking bolt to pass therethrough. The shank 54, it should be noted, is cylindrical, as is the head 52 which is carried by this shank. However, the head 52 is eccentric with respect to the axis of the shank 54. One of the plate members, in the illustrated embodiment the plate member 51 is provided with a counter sunk recess 53 of a diameter just slightly in excess of that of the head 52 and eccentric relative to the axis of the bore in the plate member 51 to the same extent as the head 52 is eccentric relative to the axis of the shank 54 of the bolt. Thus, the head 53 of the bolt is at least partly receivable in the recess 53, when the shank 54 is inserted through the aligned bores of the plate members 50 and 51. Thereupon the nut 55 is threaded onto the shank 54. Now when the nut 55 is being tightened the head 52 rotates slightly in the recess 53 so that portions of the either peripheral surface of the head 52 are wedged into engagement with the inner peripheral surface bounding the recess 53, thus locking the head 52 within this recess 53. To avoid undesired camming or wedging of this type when the threading of the nut 55 is just began that is before such wedging is desired, the head 52 may be temporarily secured in the recess 52 in the position it assumes prior to the wedging described above. This can be accomplished by placing a spot of suitable glue or other adhesive, by upsetting the material of the head 52 and in a similar manner which assures that the head 52 is held only against slight rotational forces but will yield when the nut 55 is finally turned with a certain amount of force. Thus, when the head 52 will then yield, the wedging engagement of the wedging portions takes place as described above. Of course, the shape and positions of the head 52 and the nut 55 may be reversed such that the nut 55 is cylindrical and has an eccentric threaded bore, the nut 55 fitting into the recess 53, while the head 52 is concentric with respect to shank 54, and is hexagonal, or has asimilar non-circular outline to permit easy gripping for effecting rotation with considerable force. FIG. 11 is self-explanatory and constitutes a top-plan view of FIG. 10.

Figure 12:
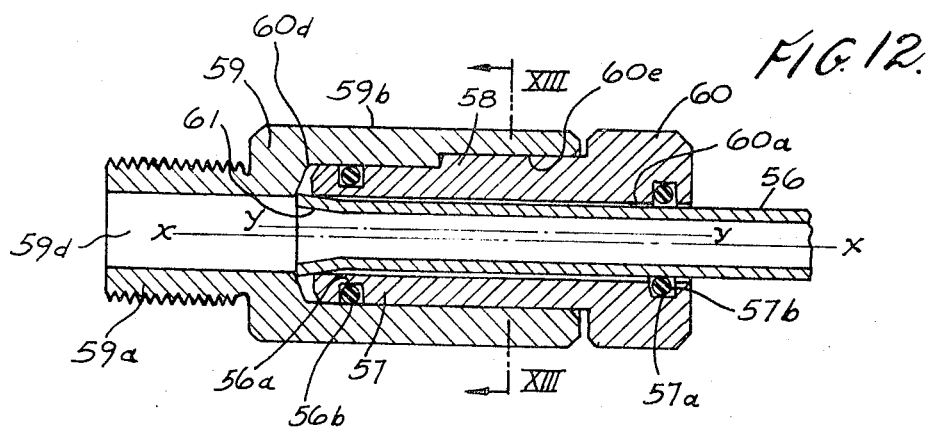
FIG. 12 is a longitudinal section taken through an additional embodiment.
Figure 13:
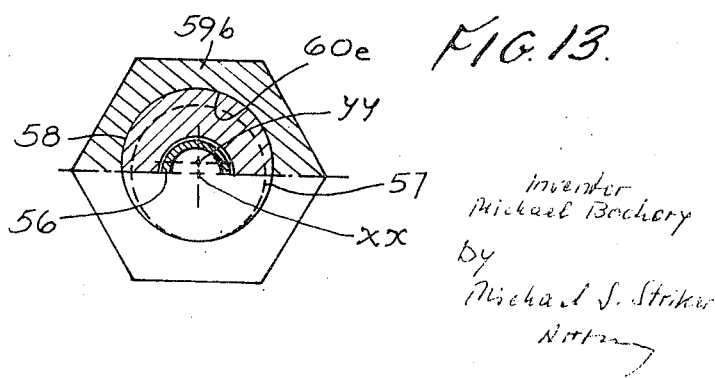
FIG. 13 is a transverse section taken on the line XIII—XIII of FIG. 12.

Coming now to FIGS. 12 and 13, it will be seen that there is illustrated in these figures an example of how the invention can be applied for the purpose of locking a cylindrical pipe 56 into an adapter sleeve 59. The adapter sleeve 59 is a female sleeve and comprises at one end thereof a cylindrical portion 59a which is preferably, but not necessarily provided with threads, and a hexagonal center portion 59b, the term hexagonal of course referring to the exterior configuration of the portion 59. The sleeve 59 is provided with a small diameter bore 59d and with a second, larger-diameter bore 60d, both of which are concentric with respect to the axis x—x. Additionally, the sleeve 59 is provided at its forward end with a large-diameter bore 60e which is eccentric relative to the axis x—x, contrary to the bores 59d and 60d. A stepped male sleeve 60 is provided with a larger cylindrical surface portion 58 eccentric with respect to the axis x—x and it is preferred to provide on the male sleeve 60 a hexagonal head for engagement with a wrench or similar tightening tool. The diameter of the cylindrical surface portion 58 is smaller than the diameter of the bore 60e only by the normal tolerance which is required to permit easy sliding movement of the members relative to one another. The male sleeve 60 is further provided at its other end with another cylindrical surface portion 57, which, however is concentric relative to the axis x—x and this cylindrical surface portion 57 is itself provided with a groove 56a which recevies an O-ring 56b.

The male sleeve 60 has, as is clearly evident from FIG. 12 a bore 60a which is slightly larger than the diameter of the pipe 56 and which at one end is provided with a groove 57a and receives in this groove and O-ring 57b. The pipe 56 is introduced into the bore 60a and is wedged or upset at 61 so that it will be retained in the male sleeve against axial withdrawal. Slight rotation of the male sleeve 60 relative to the female adapter sleeve 59 or of course vice versa, causes engagement of the eccentric surface of the cylindrical portion 58 with the surface surrounding the surface 60e, while the concentric surface of cylindrical portion 57 rotates in the concentric bore 60d. Thus, the eccentric surfaces of portions 58 and of the bore 60e change position, in effect, and a camming action results which locks female sleeve 59 to male sleeve 60. The line y—y visible both in FIGS. 12 and 13, shows the eccentricity in relation to the axis x—x in a somewhat exaggerated illustration.

Yet a further application of the novel invention is illustrated in FIGS. 14 and 15 where it will be seen that the inventive concept is applied in the locking of a light bulb into a socket therefor. The light bulb 65 in FIG. 14 differs from a conventional bulb only in that the bulb stem 63 is provided with a cylindrical jacket which comprises a bottom portion 68, concentric with an axis $x'$—$x'$ of the stem 63, and a top portion 64 which is larger in diameter than the bottom portion 68, and which has an axis $y'$—$y'$ which is concentric with respect to the axis $x'$—$x'$. The socket into which the light bulb 65 is to be locked with its stem or base 63, comprises a cylindrical section 62 having a bore which is concentric relative to the axis $x'$—$x'$ and which has a diameter just slightly larger than the external diameter of the bottom portion 63 of the base. The socket further comprises a cylindrical section 69 having a bore which is eccentric with respect to the axis $x'$—$x'$ and which has a diameter just in excess of the diameter of the top portion 64. The electrical contacts 66 and 67 of the socket and bulb respectively are standard, but it is to be noted that the contact 66 of the socket must be axially displaceable to some extent.

The operation of the embodiment of FIGS. 13 and 14 will be readily evident, it being clear that to connect the bulb 55 to its socket, the base of the bulb is inserted and pushed into the socket so that the axes of the eccentric parts coincide and the contacts 66 and 67 are brought into engagement. The bulb 65 is then rotated until a camming action occurs whereupon the bulb 58 securely retained in the socket until a reverse rotation is applied to it for the purpose of removing it from the socket.

The use of the novel invention for the purpose of locking a pulley 71 onto a shaft 76 is illustrated in FIG. 16. The pulley 71 is provided, as clearly seen in this figure, with a large-diameter bore 82 and a second large diameter bore 83, both of which are eccentric with respect to the axis $x''$—$x''$ but are parallel to the line $y''$—$y''$ which is indicated to show the eccentrical relationship, the bores 83 and 82 extending into the pulley from opposite axial ends thereof. A smaller bore 84 which is concentric with the axis $x''$—$x''$ connects the bores 82 and 83 and has a diameter large enough to permit passage of a shaft 76 therethrough with a sliding fit. Two male bushings 80 and 81 are provided and are located at opposite axial ends of the pulley 71. Preferably, each of the bushings 80 and 81 is provided with a wrenching means, that is a means which may be engaged to a wrench or a similar tool, and such means are identified with reference numerals 74 and 75, respectively. The outer cylindrical surfaces of the bushings 80 and 81 are respectively eccentric with respect to the axis $x''$—$x''$ but are parallel with the line $y''$—$y''$ which again indicates the eccentric relationship.

The bushings 80, 81 are respectively provided with small bores 87 and 88, which are just slightly larger than the shaft 76 so that the latter can pass readily through these bores. It is to be noted that the bores 87 and 88 are concentric with respect to the axis $x''$—$x''$. The diameter of the outer cylindrical surfaces of the bushings 80 and 81 is slightly smaller than the diameter of the bores 82 or 83 of the pulley 71, so that the bushings 80 and 81 can be introduced into the bores 82 and 83, respectively. Once the arrangement of FIG. 16 has been assembled in the manner in which it is shown in the drawing, the bushing 80 is rotated in clockwise direction whereas the bushing 81 is rotated in counterclockwise direction on the shaft 86, thus causing the eccentric surface portions 80 and 82 as well as 81 and 83 to change relative positions. This results in a camming engagement, wedging and locking the aforementioned parts together. It will be readily understood by those skilled in the art that, depending on the direction of rotation of the pulley 71, one of the bushings 80 and 81 will tend to provide a wedging action stronger than that of the other bushing.

Figure 17:
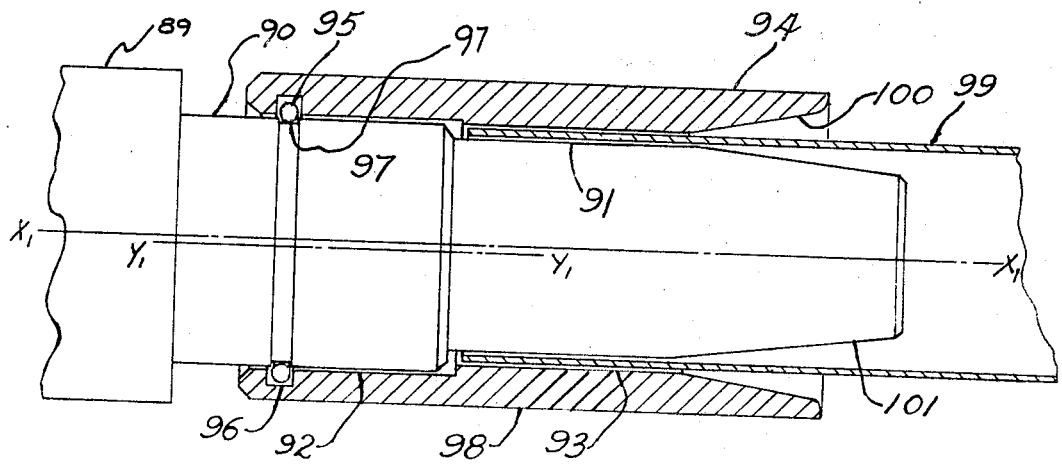
FIG. 17 is a partially sectioned fragmentary view of yet a further embodiment of the invention.

FIG. 17 shows the application of the novel invention in a fastening arrangement in which a thin-walled tube is to be secured to a connector device. A male member 89 is provided with various respective portions and includes a cylindrical peripheral surface 90 which is somewhat eccentric relative to the axis $x_1$—$x_1$ of the member 89, such eccentricity being indicated by the line $y_1$—$y_1$ extending parallel to the axis $x_1$—$x_1$. A forwardly adjoining portion of the member 89 is provided with an exterior peripheral surface 91 which is also of cylindrical configuration but which is concentric with the axis $x_1$—$x_1$. A female sleeve 98 is provided having a through-going bore 92 slightly larger than the circular eccentric surface 90 of the bore 89. The member 92, it should be noted is eccentric with the axis $x_1$—$x_1$, its own axis coinciding with the axis $y_1$—$y_1$. A second or counter bore 93 extends into the sleeve 100 from the end thereof opposite to the bore 92 and this counter bore 93 is concentric with the axis $x_1$—$x_1$ and large enough to accept the thin-walled tube 99. The tolerance between the inner wall of the tube 99 and the surface 91 on the one hand, and the outer wall of the tube 99 and the surface of the bore 93 on the other hand, should preferably not exceed half of the eccentricity existing between the surface 90 and the bore 92.

The circular surface 90 is also provided as shown in FIG. 17, with a peripheral groove 97 of circular outline whereas the bore 94 is provided with a similar peripheral groove 96 of circular outline. When the arrangement is assembled as shown in FIG. 17, these grooves 96 and 97 are aligned and a snap ring 95 is received in the grooves 96 and 97 for the purpose of preventing axial movement of the sleeve 98 relative to the member 89 and vice versa. Preferably, but not necessarily, the sleeve 89 may be provided with a knurled surface 94, to facilitate its gripping for tightening purposes. The sleeve 98 may further be provided at one end with a conical bore 100 and the cylindrical surface 91 may have a conically tapering forward portion 101 to facilitate insertion of the portion 101 into the tube 99. It will be clear from FIG. 17 that the tube 99 is displaced between the circular surface 91 and the inner peripheral surface of the bore 93 until it abuts against the shoulder which separates eccentric circular surface 90 from the circular surface 91. Thereupon, the member 89 and the sleeve 98 are rotated with reference to one another, resulting in the wedging action which has already been described before, and locking the tube 99 securely in place. In other words, a camming action is produced between the surfaces 90 and 92, as well as between the surface 91, the tube 99 and the bore 93. The frictional force developed in this way is directly dependent upon the magnitude of eccentricity which is provided.

Figure 18:
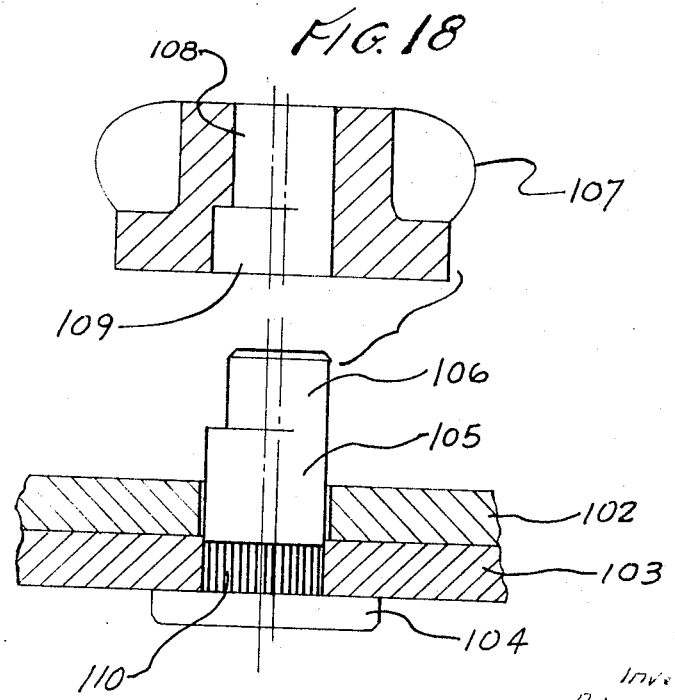
FIG. 18 is a partially sectioned fragmentary view of an arrangement showing a further embodiment of the invention which constitutes a modification of the embodiment shown in FIG. 10.

The arrangement shown in FIG. 18 is substantially similar to that of FIGS. 10 and 11. The difference here is that the panels 102 and 103 are held together with a somewhat modified connector. The connector here is provided with a head 104 and with a shank which again is received in aligned bores in the panels 102 and 103. Unlike FIGS. 10 and 11, however, the shank comprises a first portion 105 having a cylindrical exterior surface which is concentric with the axis of the shank and a second portion 106 having a cylindrical exterior surface which is eccentric with respect to the axis of the shank. A wing nut 107 is provided having a through-going bore which also consists of two portions. In other words, the bore of the wing nut 107 is stepped and comprises a first portion 108 complementary to the portion 106 and a second portion 109 complementary to the portion 105. It will be evident that all that is necessary for effecting connection of the wing nut to the bolt, and thus effecting securing of the panels 102 and 103 to one another, is to push the wing nut onto the shank of the bolt and to twist it relative to the bolt, thus providing a camming action which has been described repeatedly before. Adjacent the head 104 of the bolt or stem, the shank may be provided with a knurled portion 110, if desired, and this portion will be located, when the arrangement is assembled in the bore of one of the panels, the purpose of this knurled portion 110 being, of course, to secure the bolt or stem against rotation when the wing nut 107 is turned and thereby locked onto the bolt.

Figure 19:
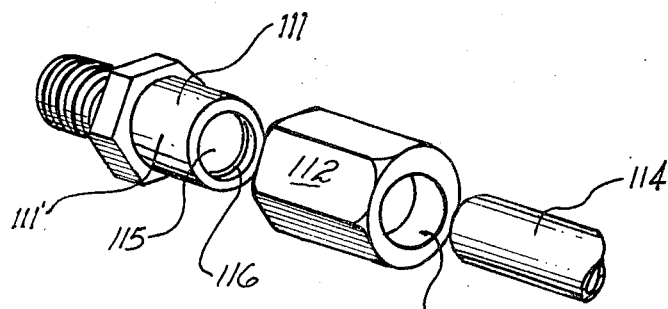
FIG. 19 is an exploded view of a hydraulic fitting embodying my invention.

FIG. 19 illustrates the novel invention in an embodiment in which it is utilized in a hydraulic fitting. A nipple or first tube 111 is provided having an exterior cylindrical surface 111′ which is concentric with the axis of the member 111. The member 111 further has a bore 115 which is eccentric with respect to the axis of member 111 and an O-ring 116 is provided in a suitable groove located in the peripheral wall which bounds this wall 116. A female sleeve 112 constitutes a part of the arrangement of FIG. 19 and is provided with a bore 113 which is eccentric with respect to the axis of member 111. A tube 114 is to be locked to this arrangement and if inserted into the bore 113 and into the bore 115, rotation of the sleeve 112 in clockwise direction will then produce a camming engagement between the surface of the tube 114 and the inner surface bounding the bore 113 on the other hand, thus locking the tube 114 to the arrangement consisting of the members 111 and 112. Such a fitting has been found to withstand pressures on the order of 6,000 pounds per square inch.

Figure 20:
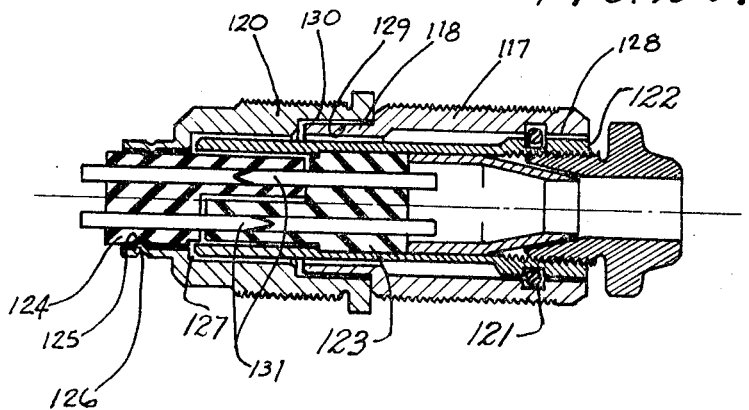
FIG. 20 is a longitudinal section through an electrical connector embodying my invention.

Coming, finally, to FIG. 20, it will be seen that this illustrates an electrical connector embodying my novel invention. A male member 117 will be seen to comprise a forward portion 118 of lesser exterior diameter than the remainder of the member 117. This forward portion 118 is received in an axial bore of a female member 119, this axial bore being provided in a complementary forward portion 120 of the member 119. The bore provided in the portion 120 is bounded by an inner circumferential surface 130 and the portion 118 of the member 117 has an outer peripheral cylinder surface 129, both the surfaces 129 and 130 being eccentric with respect to the axis of the respective members by .010×2, this being a preferred but not mandatory value Included in the through-going bore of the member 117 near the end thereof is a snap ring 121 which is received in an inner circumferential groove and a corresponding outer circumferential groove provided on a tube 122 which extends through the member 117 and into the member 119. The outer peripheral surfaces 128 of tube 122 are concentric with the axis of the tube which in turn is coaxial with member 117, and the inner circumferential surface 127 bounding a rearward extension of the bore provided in the portion 120 of the female member 119 is also concentric with this axis. A first member 124 of insulating material is received within the tube 122 and a cooperating second member of a complementary configuration is carried by the female member 119 and indicated with reference numeral 128. It is to be noted that the insulating member 124 is provided with a peripheral groove 125 into which an inner circumferential circular projection 126 provided in the member 119 extends thus locking the member 124 to the member 119 and preventing axial or other displacement of the member 124 relative to the female member 119. Each of the members 123 and 124 is provided with passages, which in the noted condition of the arrangement are aligned, and pins or electrical connections 131 in a manner which is well known and need not be further described, mention here being made only for the sake of completeness.

It will be understood that in this arrangement as in all the preceding embodiments, rotation of the member 119 relative to the member 117 will provide locking of the tube 122, inasmuch as rotation in this manner results in a camming action between the surfaces 129 and 130 as well as between the surfaces 127 and 128.

Although a considerable variety of embodiments has been shown herein, it will be clear that this is by no means exhaustive of the great number of possibilities for application of my novel invention in a multitude of fields. All of such possible applications and variations are of course intended to be encompassed in the protection sought. It will be further understood that the degrees of eccentricity which have been mentioned herebefore are by way of example only and are in no manner intended to be limiting. For instance, the eccentricity may be as small as $0.005R > e > 0.22R$. Thus, the wedging angle may be comprised between 1 and 15 degrees, it being understood that sin of one degree 36′=0.028 sin of 12 degrees 42′=0.22.

It will be understood that each of the elements described above, or two or more together, may also find a useful application in other types of fastening arrangements differing from the types described above.

While the invention has been illustrated and described as embodies in a fastening arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the invention.

What is claimed as new and desired to be protected by Letters Patent is set forth in the appended claims:

1. A locking arrangement comprising, in combination, a female member having an inner circumferential surface of circular outline concentric with a first axis; a male member having an outer peripheral surface of circular outline received within the confines of said inner surface and concentric with a second axis parallel to said first axis when said members are in one angular position relative to one another; and cam means operatively associated with said members for moving one of said members radially with reference to the other with concomitant change in the spacing between said axes in response to rotational displacement of said members relative to one another out of said one position, whereby portions of said surfaces are wedged into strong frictional engagement when said members are rotationally displaced relative to one another in one direction, and moved out of such frictional engagement when said members are rotationally displaced relative to one another in the opposite direction.

2. A locking arrangement as defined in claim 1, wherein one of said surfaces is provided with a plurality of teeth projecting therefrom and adapted to penetrate into the other surface in response to said angular displacement of said members.

3. A locking arrangement as defined in claim 1, wherein said cam means comprises a portion integral with one of said members.

4. A locking arrangement as defined in claim 1, wherein said female member comprises a first bore bounded by said inner circumferential surface, and a smaller-diameter second bore of circular outline constituting an extension of said first bore; wherein said male member is provided with a third bore of circular outline which is axially aligned with said second bore when said male member is received in said first bore; and wherein said cam means comprises a cylindrical auxiliary member received in said second and third bores.

5. A locking arrangement as defined in claim 1; and further comprising sealing means operatively associated with said members for fluid-tightly sealing the connection between the same.

6. A locking arrangement as defined in claim 4; and further comprising retaining means provided on said auxiliary member for preventing axial movement thereof within said second and third bores.

7. A locking arrangement as defined in claim 1; and further comprising gripping means provided on one of said members for facilitating forcible angular displacement of the same with reference to the other member.

8. A locking arrangement as defined in claim 5, wherein said sealing means comprises a circumferential groove provided in one of said surfaces, and an annular sealing member of resiliently compressible material received in said groove.

9. A locking arrangement as defined in claim 1, wherein said male member has two end portions each provided with an outer peripheral surface of circular outline; and further comprising an additional female member also having an inner circumferential surface of circular outline; the respective end portions being received in the respective female members; and wherein said cam means moves one of said members radially with reference to the remaining members in response to angular displacement of such members.

10. A locking arrangement as defined in claim 1, wherein said female member is provided with a bore extending therethrough within the outlines bounded by said inner circumferential surface, said bore having an interior circumferential surface of circular outline, and wherein said male member is provided with a bore located within the outlines bounded by said outer peripheral surface and having an inner peripheral surface of circular outline, said bores being in substantial alignment; and wherein said cam means includes an auxiliary member received in said bores and wedged into engagement with portions of said interior circumferential surface and of said inner peripheral surface when said members are angularly displaced relative to one another in said one direction.

References Cited

UNITED STATES PATENTS

| 954,957 | 4/1910 | Harriman et al. | 285—394 |
| 958,752 | 5/1910 | Mackensen | 285—394 X |
| 1,148,844 | 8/1915 | Jackson | 285—394 |
| 1,405,342 | 1/1922 | Shaffer. | |
| 1,872,048 | 8/1932 | Thomas | 285—178 X |
| 1,974,150 | 9/1934 | Creveling | 285—40 X |
| 2,212,745 | 8/1940 | McIntosh | 285—233 |

FOREIGN PATENTS

| 1,098,480 | 3/1955 | France. |
| 596,057 | 12/1947 | Great Britain. |

CARL W. TOMLIN, Primary Examiner.

WAYNE L. SHEDD, Assistant Examiner.

U.S. Cl. X.R.

287—58, 126; 285—374; 339—89